United States Patent [19]

Jessup et al.

[11] Patent Number: 5,075,947

[45] Date of Patent: Dec. 31, 1991

[54] FLEXIBLE INJECTOR PULLER

[75] Inventors: James L. Jessup, Shelbyville; John J. Purcell, Columbus, both of Ind.

[73] Assignee: Cummins Engine Company, Inc., Columbus, Ind.

[21] Appl. No.: 500,947

[22] Filed: Mar. 29, 1990

[51] Int. Cl.[5] .................. B23P 19/04

[52] U.S. Cl. .................. 29/254

[58] Field of Search .................. 29/254, 255, 275, 270, 29/264; 81/52.3, 52.35

[56] References Cited

U.S. PATENT DOCUMENTS

| | | | |
|---|---|---|---|
| 3,691,610 | 9/1972 | Harding | 29/255 |
| 3,729,802 | 5/1973 | Lorenz | 29/254 |
| 3,757,409 | 9/1973 | Flanigan | 29/254 |
| 4,387,697 | 6/1983 | Duke | 29/254 |
| 4,561,159 | 12/1985 | Schuster | 29/255 |

FOREIGN PATENT DOCUMENTS

| | | | |
|---|---|---|---|
| WO8500026 | 1/1985 | PCT Int'l Appl. | 29/254 |

*Primary Examiner*—Robert C. Watson
*Attorney, Agent, or Firm*—Sixbey, Friedman, Leedom & Ferguson

[57] ABSTRACT

A removal tool which includes an elongated member with two attachment devices of different size located at opposing ends thereof. A slidable hammer receives the elongated member through a longitudinal bore permitting it to slide the entire length of the elongated member which is formed of a flexible material. A component, i.e. a fuel injector, is removed by coupling a chosen attachment device to the component and then applying sharp upward strokes with the slide hammer against the remaining attachment device.

10 Claims, 4 Drawing Sheets

FLEXIBLE INJECTOR PULLER

TECHNICAL FIELD

The present invention is related to a tool for the removal of objects, and, more particularly to a tool used for removing fuel injectors from diesel engine blocks.

BACKGROUND ART

To satisfy the need for greater efficiency and increased emission control, modern diesel engines have become more complex increasing the difficulty of removing parts for repairs or replacement. More specifically, fuel injectors are especially difficult to remove because of carbon buildup in the injector receiving cavity. Fuel injectors adhere to the inner surface of the injector receiving cavity due to carbon build up at the tips of the fuel injector. Because of the carbon build up, impulse force must often be applied to remove an injector causing a risk of damaging the injector or possibly damaging the surrounding engine components.

In the past, conventional tools, such as a crescent wrench, were used to clamp and loosen an injector. These tools, however, were not readily able to reach injectors in obstructed areas of the engine and could therefore cause damage to the injector or surrounding engine components. Moreover, excessive carbon build up at the tip of the injector between the injector body and the cavity in which it is received also required more force than a conventional tool could provide requiring manual tapping of the tool or injector body with a hammer, for example, which obviously could result in damage.

Tools have been manufactured to attempt to solve the problem, however, many are not readily adaptable to avoid obstructions encountered in the engine. U.S. Pat. No. 4,293,992 issued to Webb discloses a diesel fuel injector tool for removing an injector without damaging adjacent component parts. The tool utilizes a rigid member having a U-shaped injector engaging structure at one end. The injector engaging structure requires that the injector be equipped with a ridge or lip to provide a leverage point. The rigidity of the tool may also limit its use in certain engines due to obstructions.

U.S. Pat. No. 4,561,159 issued to Schuster discloses an adaptor and fitting for removing diesel engine fuel injectors and for connecting an impacting tool. The adaptor is designed to receive a gripping member at the top of the injector. This gripping member may be hexagonal in shape requiring the adapter to be forged as such. This requires different adapters to match differing fuel injectors.

U.S. Pat. Nos. 2,572,370 and 4,034,594 issued to Moeller and Morgan, respectively, disclose impacting tools utilizing a slide hammer to provide impact force. These tools, however, are rigid and exhibit the same problems of adaptablity around obstructions as discussed previously.

U.S. Pat. No. 3,691,610 issued to Harding discloses a die puller for removing die elements in printing equipment including a flexible member attached to a rigid slide hammer device. This device, however, requires at least three points of attachment and is equipped with only one removing head. Harding also does not teach its adaptability for the removal of fuel injectors.

Accordingly, there is a need for a removal tool which overcomes the known problems and provides a simple device useable at a variety of angles to adapt to various obstructions.

SUMMARY OF THE INVENTION

A primary objective of the present invention is to provide a simple removal tool including an elongated member equipped with a weighted hammering device and two differently shaped attachment couplings each located at opposing ends of the elongated member, respectively, for attachment to similarly shaped objects for removal.

Another object of the present invention is to provide a simple removal tool as stated above wherein the elongated member is comprised of a flexible material, such as steel cable, to allow removal of objects from a variety of angles.

Yet another object of the present invention is to provide a simple removal tool as stated above in which the weighted hammering device is cylindrical in shape having a longitudinal bore to receive the elongated member to permit sliding. The hammering device is further equipped with hand guards to protect the user while attempting to remove an object.

Still another object of the present invention is to provide a simple removal tool for removing fuel injectors including an elongated flexible member and a weighted hammering device having a longitudinal bore for slidably receiving the flexible member whereby the hammering device may be used to impart an impulse force to an abuttment member connected to one end of the elongated member. Connected at the other end of the elongated member is an attachment coupling, internally threaded, to allow coupling with a correspondingly sized threaded upper portion of the fuel injector being removed. Further, the abuttment member may be a second attachment coupling of a different size than the first coupling.

These objectives are accomplished by providing a simple removal tool which includes two differently sized fuel line nuts soldered to the ends of an elongated member. Preferably, the elongated member is made of a flexible material, such as steel cable, to allow the removal of a fuel injector from a variety of angles. A weighted hammering device receives the elongated member in a longitudinal bore located along the center of the hammering device so that the device can slide freely up or down the elongated member. More specifically, to remove a fuel injector from a combustion engine, a threaded nut is coupled with the upper threaded portion of a fuel injector having the same dimension as the nut. Then, the hammer device is slid upward to strike the threaded nut at the opposite end of the elongated member, imposing an impulse force to the injector. Sharp upward strokes are continued until the fuel injector is pulled free from the injector cavity.

Other and more specific objects of the invention may be understood from the following Brief Description of the Drawings and Detailed Description of the Preferred Embodiment.

DETAILED DESCRIPTION OF THE PREFERRED EMBODIMENT

Figure 1:
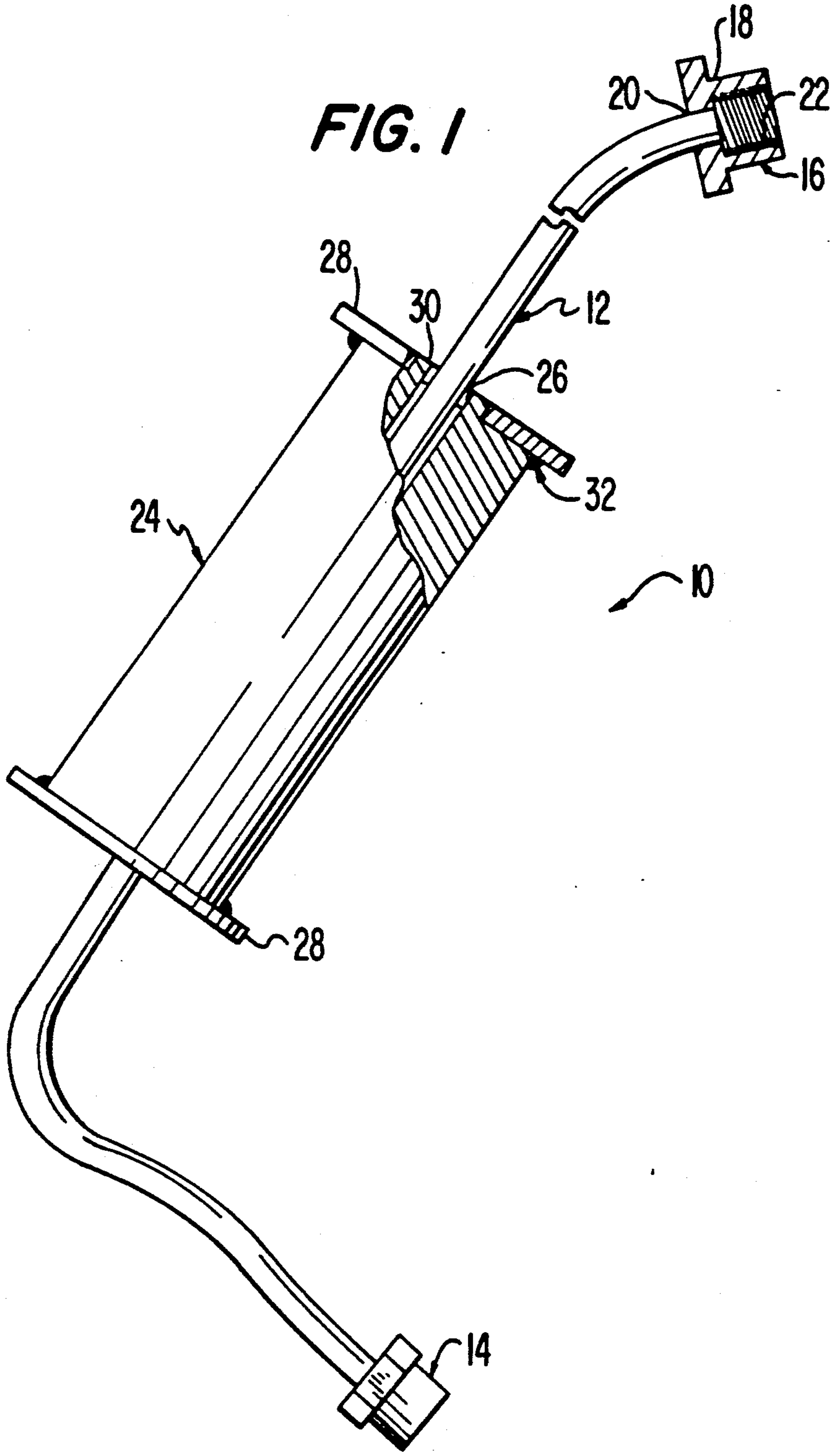
FIG. 1 is a partially cut away, front elevational view of the removal apparatus embodying the teachings of present invention.

For a clear understanding of the subject invention reference is initially made to FIG. 1 in which a removal tool 10 designed in accordance with the subject invention is illustrated. In particular, the removal tool 10 in FIG. 1 includes an elongated flexible member 12 and a pair of engine fuel line nuts 14 and 16 connected at each end of member 12. Removal tool 10 further includes a hammering device 24 which allows application of an impulse force against one of the fuel nuts 14 and 16. By using a flexible material for elongated member 12, objects, i.e. fuel injectors, may be removed from a variety of angles. The many unique features of removal tool 10 will be better understood by a detailed explanation of the components and their function.

Removal tool 10 includes elongated member 12 which is a single, continuous component. Preferably, elongated member 12 is composed of a flexible material, such as steel cable. The simplicity of elongated member 12 allows the adaptation of a variety of different attachment devices to its opposing ends. In the embodiment shown in FIG. 1, fuel line nuts 14 and 16 are utilized to facilitate removal of fuel injectors equipped with a threaded upper portion which is primarily responsible for securing a fuel line nut to provide fuel to the injector's body. Fuel nuts 14 and 16 are differently sized fuel line nuts to allow removal of correspondingly differently sized fuel injectors. More specifically, fuel line nuts 14 and 16 are 12 mm and 14 mm nuts, respectively, allowing use of removal tool 10 in a majority of combustion engines equipped with axial fuel injectors.

Fuel line nuts 14 and 16 receive the end of elongated member 12 at point 18 and are secured to the ends by some form of attachment such as soldering at point 20. Preferably, a silver solder is applied to provide a superior hold.

Figure 2:
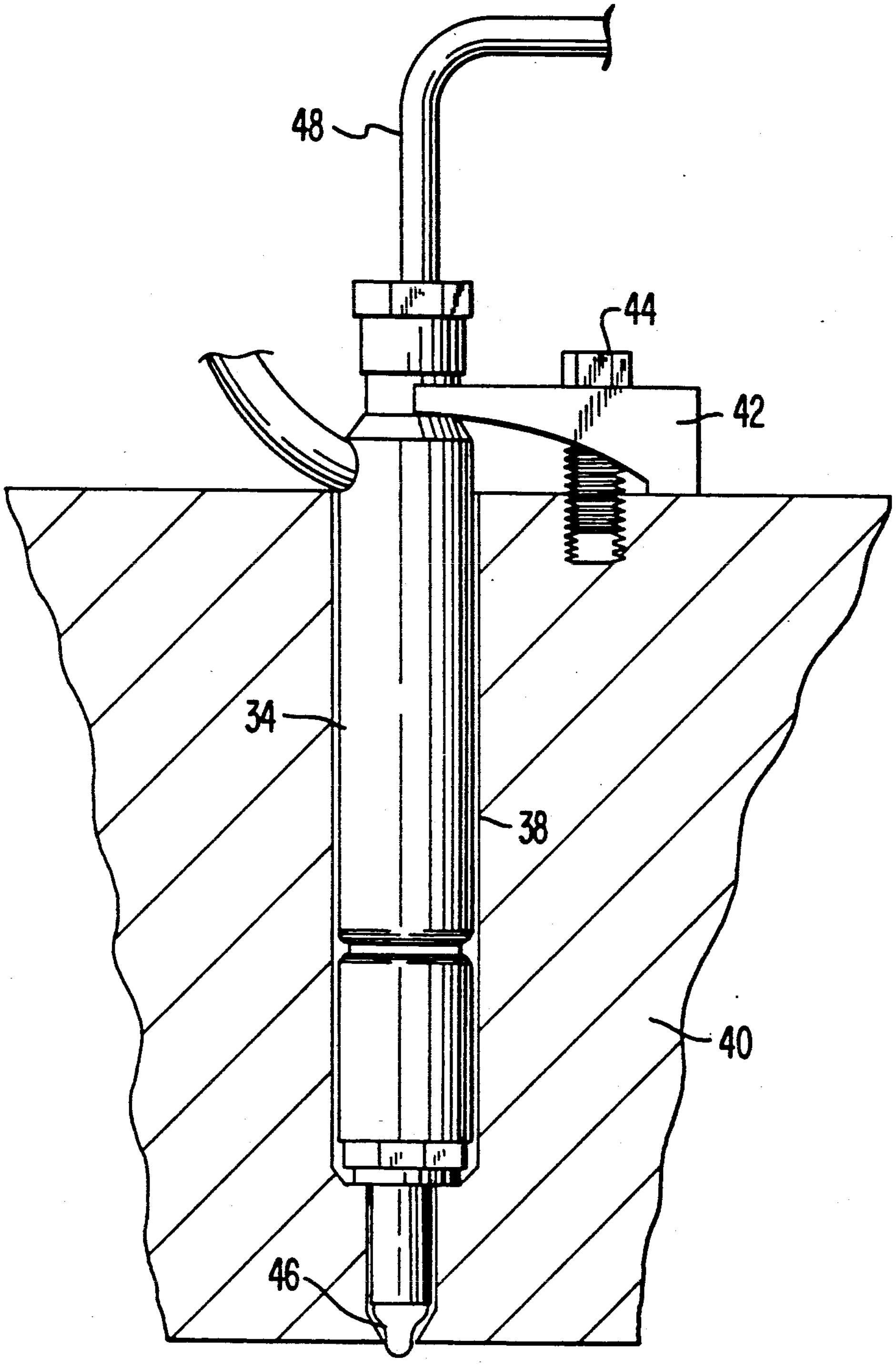
FIG. 2 is a cross sectional view of an engine prior to removal a fuel injector.
Figure 3:
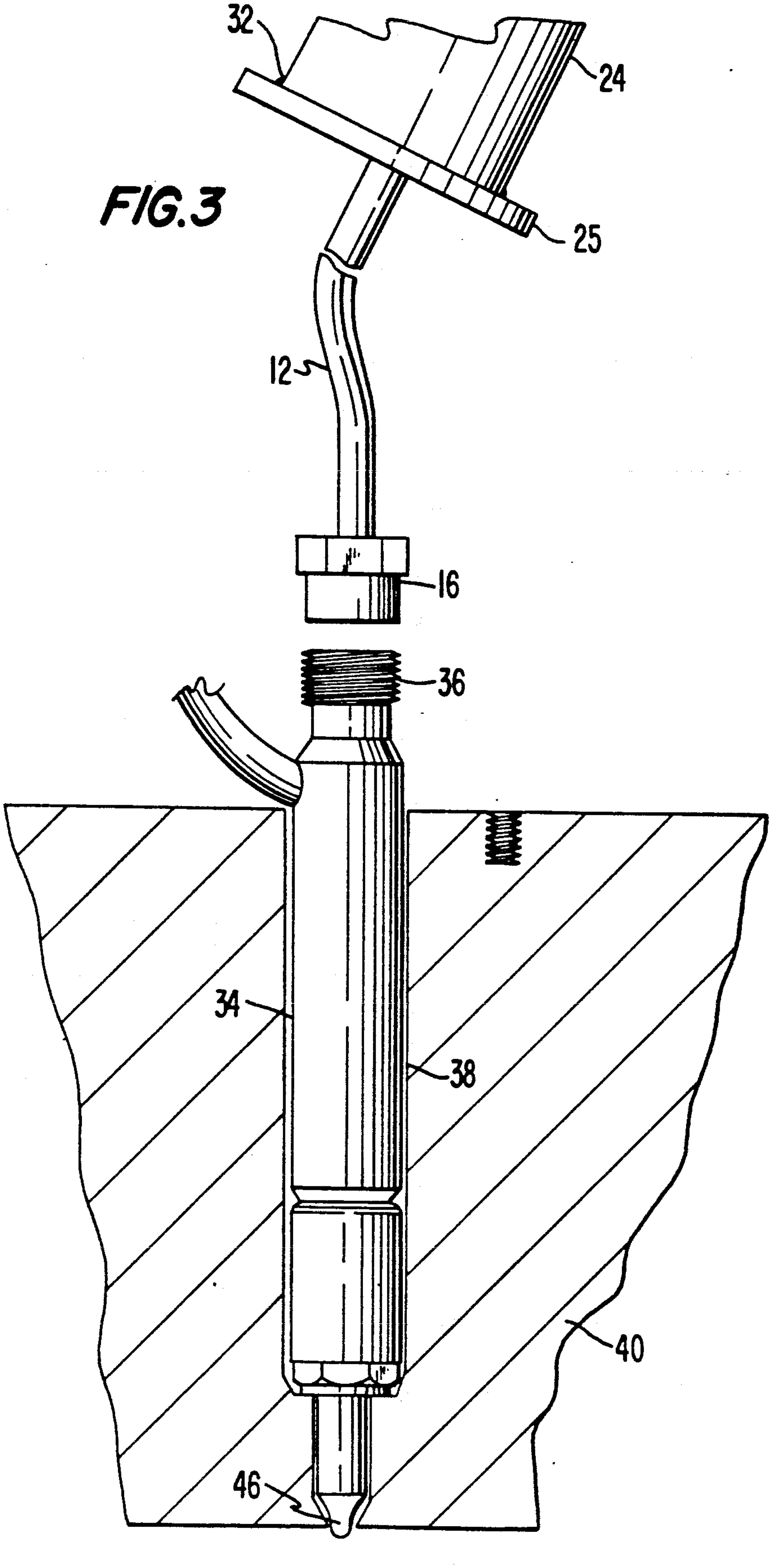
FIG. 3 is a cross sectional view of an engine just prior to attachment of the subject invention in preparation for removal of a fuel injector.

Further, FIG. 1 illustrates the inner threads 22 of fuel nut 16. Threads 22 matingly engage the exterior threads of a correspondingly sized upper portion 36 of fuel injector 34 as shown in FIGS. 2 and 3. The security of a threaded attachment between fuel nut 16 and upper portion 36 allows application of a sufficient force to remove fuel injector 34.

Figure 4:
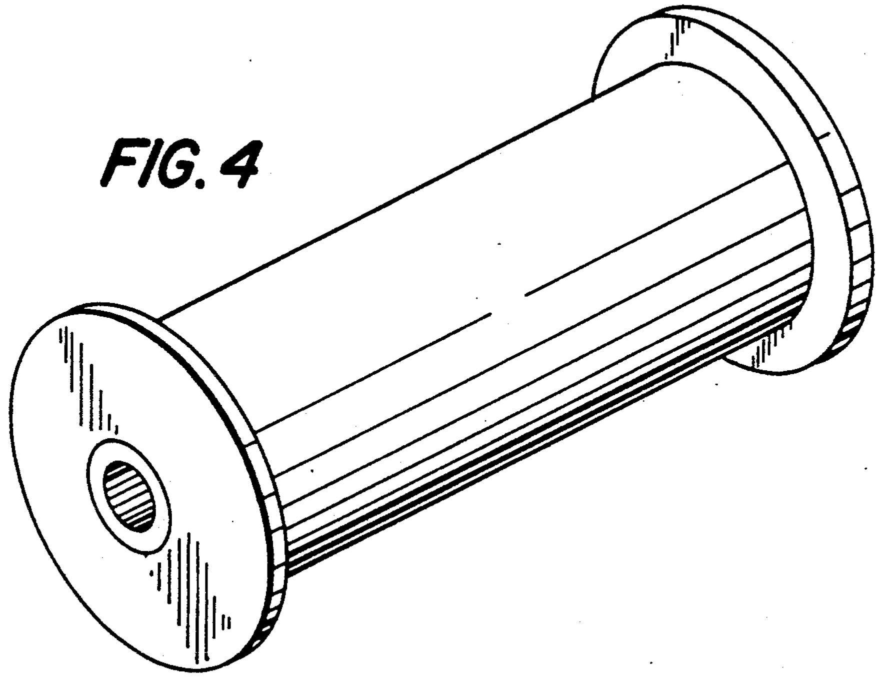
FIG. 4 is a perspective view of a hammering device employed in the subject invention.

Sufficient removal force is supplied to injector 34 by hammer device 24 shown in FIGS. 1 and 4. Hammer device 24 is preferably cylindrical in shape having a longitudinal bore 26 to receive elongated member 12. The diameter of bore 26 is sufficiently larger than the diameter of elongated member 12 so hammer device 24 may freely side along member 12. Further, hammer device 24 includes hand guards 28 at each end to protect the users hands during use. Hand guards 28 can be plain washers whose outer diameter is greater than that of hammer device 24. The cut-away portion of hammer device 24 in FIG. 1 adequately shows a raised portion 30 formed around the periphery of elongated bore 26 wherein the inner diameter of raised portion 30 is equal to that of bore 26 and whose outer diameter is slightly less than the inner diameter of washer 28. Raised portion 30 provides support for washer 28. Washer 28 is further secured to hammer device 24 by brazing washer 28 to hammer device 24 along seam 32. FIG. 4 provides a perspective view of hammer device 24 alone.

The use of removal tool 10 is more readily explained with reference to FIG. 2–4. Before removal, injector 34 is secured in injector cavity 38 of engine head 40. A clamp 42, attached to the head 40 by a bolt 44, holds the injector in place during normal engine operation. As stated previously, simply removing clamp 42 is not enough to allow removal of fuel injector 34 because of carbon build-up in the area surrounding the injector tip 46 which adheres injector tip 46 to the interior wall of the injector cavity. To remove the injector, fuel line 48 is removed from the threaded upper portion 36 of the injector. Similarly, bolt 44 is removed from head 40 to release clamp 42. Next, nut 16 is threadingly engaged to threaded upper portion 36. See FIG. 3. The user must then grasp hammer device 24 and forceably slide hammer device 24 sharply upward to strike fuel nut 14 which is not attached to the fuel injector. Sharp upward strokes must be continued until the injector actually brakes free from the carbon build-up and can then be removed.

As noted above, nut. 14 may be provided with a different size internal thread to allow the disclosed removal device to be used to remove injector having mating external threads of corresponding size. The flexibility of elongated member 12 and the ability to remove two differently sized objects combine to provide a removal tool which can be used in a variety of settings. Despite this flexibility, the disclosed removal device is extremely simple in design and inexpensive to manufacture.

INDUSTRIAL APPLICABILITY

The invention has particular utility in areas of maintenance and repair of equipment. The disclosed removal tool is ideally suited for removing fuel injectors from a majority of combustion engines. The disclosed removal tool could, however, be used for removal of a wide variety of other component parts.

We claim:

1. An apparatus for removing objects having different predetermined shapes, comprising:
   (a) an elongated member;
   (b) a first attachment means connected to one end of said elongated member for attachment to an object of a first predetermined shape;
   (c) a second attachment means connected to the other end of said elongated member for attachment to an object of a second predetermined shape different from the first predetermined shape; and
   (d) a hammer means slidably connected to said elongated member for application of an impulse force to one of said first and said second attachment means when the other of said first and said second attachment means is connected to an object.

2. An apparatus, as set forth in claim 1, in which said elongated member is comprised of a flexible material.

3. An apparatus, as set forth in claim 1, wherein said hammer means includes an elongated central body, having a longitudinal bore for slidably receiving said elongated member.

4. An apparatus, as set forth in claim 3, wherein said hammer means further includes guard means attached at opposite ends of said elongated central body of said hammer means to protect a users hand from injury.

5. An apparatus, as set forth in claim 4, wherein said guard means is a flat circular disk including an outer diameter substantially greater than the outer diameter of said elongated central body of said hammer means and an axial cut-out to further receive said elongated member.

6. An apparatus, as set forth in claim 5, further including of a raised portion located at the ends of said elongated central body of said hammer means in which said raised portion has an inner diameter equal to the diameter of said longitudinal bore and an outer diameter slightly less than the diameter of said axial cut-out of said disk to secure said disk in mating relation with said raised portion.

7. An apparatus, as set forth in claim 1, wherein said first and said second attachment means are shaped differently to allow mating engagement with a correspondingly shaped object.

8. An apparatus, as set forth in claim 7, wherein said first an said second attachment means are threaded nuts of differing internal diameter which allow removal of fuel injectors having mating threaded upper portions, respectively.

9. An apparatus, as set forth in claim 8, further including a solder to connect said first and said second attachment means to said elongated member.

10. An apparatus for removing fuel injectors having a fuel line coupling with a threaded upper portion of a predetermined size comprising:

(a) an elongated flexible member;

(b) an attachment means connected to one end of said elongated flexible member including an inner threaded portion of a first predetermined size to matingly receive said threaded upper portion of said fuel injector having the same predetermined size;

(c) an abutment member connected to the end opposite said attachment means on said elongated flexible member; and (d) a hammer means slidably connected to said elongated member for application of an impulse force to said abutment member when said attachment means is coupled to a fuel injector wherein said abuttment member forms a second attachment means including an inner threaded portion of a different predetermined size from said first predetermined size to matingly receive a threaded upper portion of a fuel injector of said different predetermined size.

* * * * *